US012095146B2

(12) United States Patent
Wu et al.

(10) Patent No.: US 12,095,146 B2
(45) Date of Patent: Sep. 17, 2024

(54) ELECTRONIC DEVICE

(71) Applicant: PEGATRON CORPORATION, Taipei (TW)

(72) Inventors: Chien-Yi Wu, Taipei (TW); Hau Yuen Tan, Taipei (TW); Chao-Hsu Wu, Taipei (TW); Cheng-Hsiung Wu, Taipei (TW); Chen-Kuang Wang, Taipei (TW); Shih-Keng Huang, Taipei (TW); Chia-Hung Chen, Taipei (TW); Sheng-Chin Hsu, Taipei (TW); Hao-Hsiang Yang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 91 days.

(21) Appl. No.: 17/746,863

(22) Filed: May 17, 2022

(65) Prior Publication Data

US 2023/0033219 A1 Feb. 2, 2023

(30) Foreign Application Priority Data

Jul. 29, 2021 (TW) ................................ 110127964

(51) Int. Cl.
*H01Q 1/22* (2006.01)

(52) U.S. Cl.
CPC ................................ *H01Q 1/2291* (2013.01)

(58) Field of Classification Search
CPC .... H01Q 1/2291; H01Q 5/364; H01Q 9/0421; H01Q 1/24
See application file for complete search history.

(56) References Cited

U.S. PATENT DOCUMENTS

| | | | | |
|---|---|---|---|---|
| 10,490,881 | B2 * | 11/2019 | Azad | H01Q 9/0421 |
| 10,542,130 | B1 * | 1/2020 | Lo | H01Q 9/42 |
| 2010/0321253 | A1 | 12/2010 | Ayala Vazquez et al. | |
| 2013/0009833 | A1 * | 1/2013 | Kough | H01Q 13/10 343/770 |
| 2020/0112080 | A1 * | 4/2020 | Wu | H01Q 1/24 |
| 2021/0151858 | A1 * | 5/2021 | Wu | H01Q 9/0457 |
| 2022/0328961 | A1 * | 10/2022 | Wu | H01Q 5/364 |

FOREIGN PATENT DOCUMENTS

| | | |
|---|---|---|
| CN | 107293856 | 10/2017 |
| CN | 110362159 | 10/2019 |

* cited by examiner

*Primary Examiner* — Hai V Tran
*Assistant Examiner* — Michael M Bouizza
(74) *Attorney, Agent, or Firm* — J.C. PATENTS

(57) ABSTRACT

An electronic device, including a metal back cover, a front cover, a metal wall, and at least one antenna radiator, is provided. The front cover covers the metal back cover and includes a frame area. The metal wall is disposed between the metal back cover and the front cover, and forms a metal cavity corresponding to the frame area together with the metal back cover. Each of the at least one antenna radiator is disposed in the metal cavity, is connected to a first side wall of the metal back cover, and is spaced apart from the metal wall by a distance.

11 Claims, 5 Drawing Sheets

ELECTRONIC DEVICE

CROSS-REFERENCE TO RELATED APPLICATION

This application claims the priority benefit of Taiwan application serial no. 110127964, filed on Jul. 29, 2021. The entirety of the above-mentioned patent application is hereby incorporated by reference herein and made a part of this specification.

BACKGROUND

Technical Field

The disclosure relates to an electronic device, and in particular relates to an electronic device having an antenna radiator.

Description of Related Art

At present, electronic devices such as tablet computers often use metal back covers to enhance the texture, and such devices have a narrow frame design to increase the screen area, but such conditions make it difficult for an antenna to perform well.

SUMMARY

The disclosure provides an electronic device, which may concentrate the radiated energy of the antenna radiator in a specific direction and have good antenna performance.

An electronic device disclosed in the disclosure includes a metal back cover, a front cover, a metal wall, and at least one antenna radiator. The metal back cover includes a first side wall. The front cover covers the metal back cover and includes a frame area. The metal wall is disposed between the metal back cover and the front cover, and the metal wall and the metal back cover together form a metal cavity corresponding to the frame area. At least one antenna radiator is disposed in the metal cavity and is connected to the first side wall of the metal back cover, and is spaced apart from the metal wall by a distance.

Based on the above, the metal wall and the metal back cover of the electronic device of the disclosure together form a metal cavity corresponding to the frame area. The antenna radiator is disposed in the metal cavity, connected to the metal back cover, and spaced apart from the metal wall. Such a design may concentrate the radiated energy of the antenna in a specific direction to achieve good antenna performance.

DETAILED DESCRIPTION OF DISCLOSED EMBODIMENTS

Figure 1:
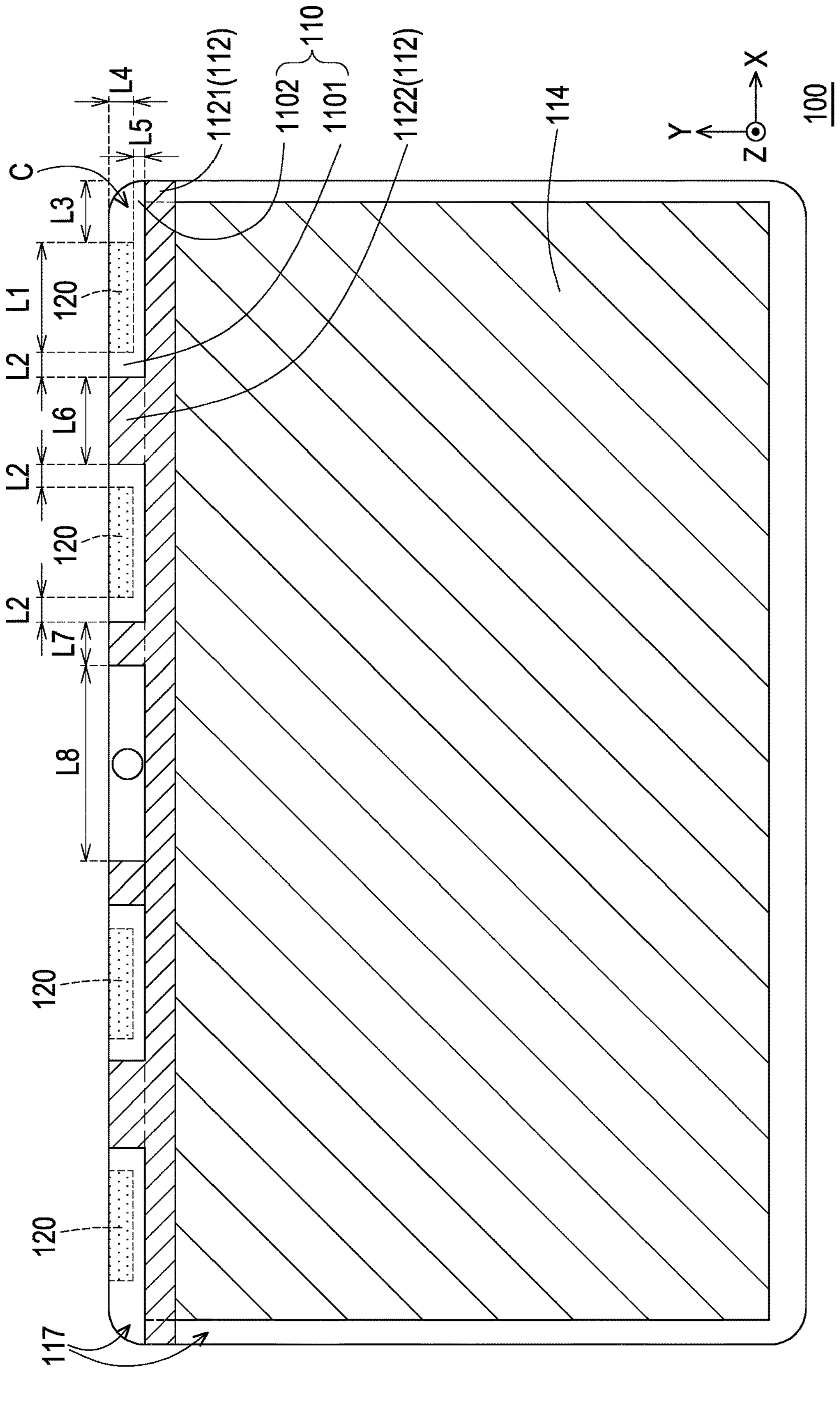
FIG. 1 is a top schematic view of an electronic device without a front cover according to an embodiment of the disclosure.
Figure 2:
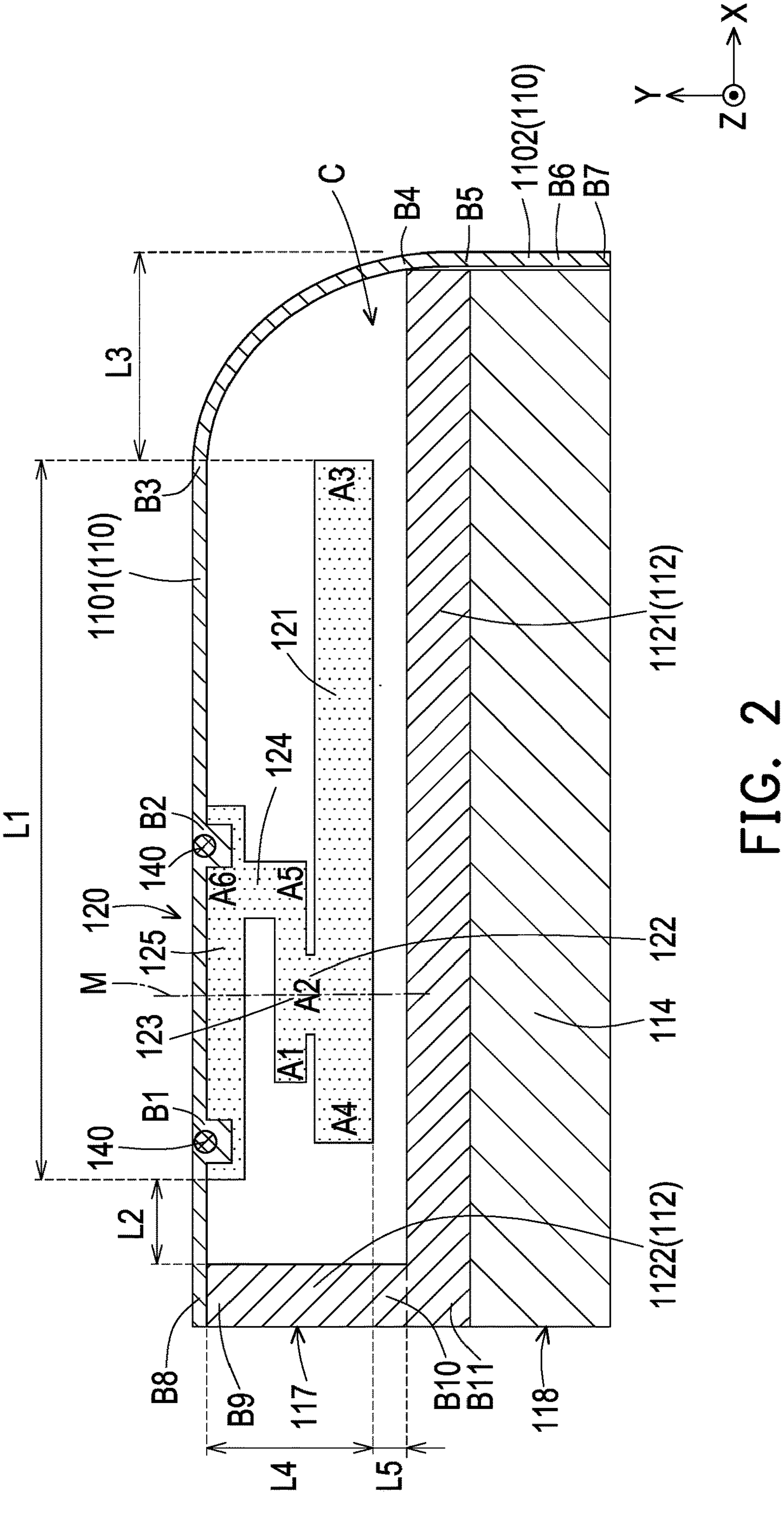
FIG. 2 is a partial enlarged schematic view of the electronic device of FIG. 1.
Figure 3:
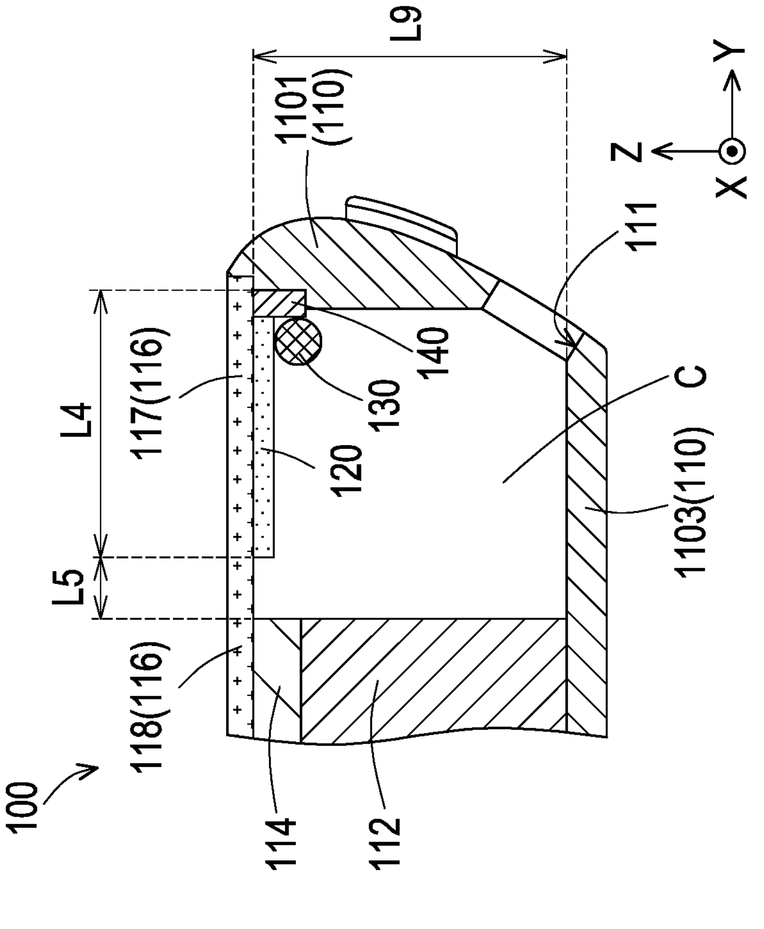
FIG. 3 is a partial cross-sectional schematic view of the electronic device of FIG. 1.

FIG. 1 is a top schematic view of an electronic device without a front cover according to an embodiment of the disclosure. FIG. 2 is a partial enlarged schematic view of the electronic device of FIG. 1. FIG. 3 is a partial cross-sectional schematic view of the electronic device of FIG. 1. It should be noted that the 120 marked in FIG. 1 refers to the location of the antenna radiator, and the pattern of the antenna radiator is shown in the enlarged view of FIG. 2.

Referring to FIG. 1 to FIG. 3, in this embodiment, an electronic device 100 is, for example, a tablet computer, but the type of the electronic device 100 is not limited thereto. The electronic device 100 includes a metal back cover 110, a front cover 116 (shown in FIG. 3), a metal wall 112, and at least one antenna radiator 120.

As shown in FIG. 3, the front cover 116 covers the metal back cover 110 and includes a frame area 117 and a display area 118, and the frame area 117 surrounds the display area 118. The front cover 116 is, for example, a glass cover of a touch screen, but the type of the front cover 116 is not limited thereto. The metal wall 112 is disposed between the metal back cover 110 and the front cover 116. In this embodiment, the electronic device 100 further includes a touch module 114 disposed between the display area 118 of the front cover 116 and the metal wall 112. The touch module 114 includes conductor lines (not shown).

The metal wall 112 and the metal back cover 110 together form a metal cavity C corresponding to the frame area 117. Specifically, the metal cavity C is formed by surrounding the first side wall 1101, a second side wall 1102, and a bottom wall 1103 of the metal back cover 110, and the metal wall 112. As shown in FIG. 2, the metal wall 112 includes a first portion 1121 and a second portion 1122 that are perpendicularly connected. The projection of the first portion 1121 of the metal wall 112 on the front cover 116 is located in the display area 118 and is connected to the touch module 114, and the projection of the second portion 1122 of the metal wall 112 on the front cover 116 is located in the frame area 117 and is connected to the first side wall 1101 of the metal back cover 110.

In this embodiment, the metal back cover 110 along the path of the positions B8, B1, B2, B3, B4, B5, B6, and B7, and the metal wall 112 along the path of the positions B8, B9, B10, B11, B4, and B5 form the metal cavity C. The antenna radiator 120 is disposed in the metal cavity C, is connected to the first side wall 1101 of the metal back cover 110, and is spaced apart from the metal wall 112 by a distance. The metal cavity C allows the radiation energy of the antenna radiator 120 to concentrate on the Y-axis and the Z-axis, to attain a good radiation effect.

As shown in FIG. 2, in this embodiment, a length L1 of the antenna radiator 120 is about 32 mm, and a width L4 is about 6.5 mm. The antenna radiator 120 is located beside the second side wall 1102 of the metal back cover 110, and a distance L3 between the antenna radiator 120 and the second side wall 1102 is between 12 mm and 16 mm, for example, 14 mm.

A distance L5 between the first portion 1121 of the metal wall 112 and the antenna radiator 120 is between 1 mm and 3 mm, for example, 1.2 mm. A distance L2 between the second portion 1122 of the metal wall 112 and the antenna radiator 120 is between 4 mm and 7 mm, for example, 5 mm.

Since the electronic device 100 is limited by a narrow frame (the sum of the width L4 and the distance L5 is 7.7 mm in total), the space where the antenna radiator 120 may be placed is limited. However, in this embodiment, the structure in which the antenna radiator 120 is disposed in the metal cavity C formed by the metal back cover 110 and the metal wall 112 may produce the function of a Wi-Fi 6E antenna. Specifically, in the metal cavity C, the length L1 (for example, 32 mm), the distance L2 (for example, 5 mm), and the distance L3 (for example, 14 mm) of the antenna radiator 120 are about 51 mm in total, which are about ¼ times to ½ times the wavelength of Wi-Fi 2.4 GHz, thereby the antenna efficiency of the Wi-Fi 6E antenna has a better performance.

In addition, a width L6 and a width L7 of the metal wall 112 are between 10 mm and 30 mm. Specifically, the width L6 is, for example, 20 mm, and the width L7 is, for example, 10 mm. In this embodiment, two antenna radiators 120 are separated by the second portion 1122 of the metal wall 112 with a width L6.

In this embodiment, the metal back cover 110 and the metal wall 112 form multiple metal cavities C, and multiple antenna radiators 120 may be placed in the metal cavities C. In addition to increasing the antenna radiation coverage, this embodiment also has the effect of blocking the noise interference of the motherboard (not shown) and improving the isolation between two adjacent antenna radiators 120. Specifically, the frame area 117 of the electronic device 100 above the touch module 114 may be configured with four antenna radiators 120, with two antenna radiators 120 respectively on the left side and the right side, and a distance L8 is about 55 mm.

In addition, as shown in FIG. 2, in this embodiment, the antenna radiator 120 includes a first segment 121 (position A4 and position A3), a second segment 122 (position A2), a third segment 123 (position A1 and position A5), a fourth segment 124 (position A5 and position A6), and a fifth segment 125 (position B1 and position B2) connected in sequence.

The third segment 123, the fourth segment 124, and the fifth segment 125 are connected by bending to form a U-shape with an opening facing to the left. The second segment 122 is connected to the third segment 123 and the first segment 121. The electronic device 100 further includes at least one coaxial transmission line 130 (the number of coaxial transmission lines 130 corresponds to the number of the antenna radiators 120, one is shown in FIG. 3), and the third segment 123 includes a feeding end (position A1), in which the feeding end is connected to the positive end of the coaxial transmission line 130. The fifth segment 125 is connected to the first side wall 1101 of the metal back cover 110 (as the system ground plane) through two conductors 140 at the position B1 and position B2 in order to be grounded. The negative end of the coaxial transmission line 130 is connected to the position B1. For example, the conductor 140 may be a screw.

The second segment 122 has a center line M perpendicular to the extending direction of the first segment 121, and a portion of the first segment 121, a portion of the third segment 123, and a portion of the fifth segment 125 are located on one side of the center line M (the right side as shown in FIG. 2) to resonate at a low frequency band, such as Wi-Fi 2.4 GHz.

Another portion of the first segment 121, another portion of the third segment 123, the fourth segment 124, and another portion of the fifth segment 125 are located on the other side of the center line M (the left side as shown in FIG. 2) to resonate at a high frequency band, such as Wi-Fi 5 GHz to 7 GHz.

In this embodiment, by adjusting the path length between the position A2 and the position A3 and the path length between the position A2 and the position A4, the frequency cutoff position of low and high frequencies may be controlled. In addition, by adjusting the lengths and widths of the slots that are formed by the loop paths of the positions A1, A2, A5, A6, and B1, the impedance matching of low and high frequencies may be controlled.

As shown in FIG. 3, a hole 111 is configured between the first side wall 1101 and the bottom wall 1103, and the hole 111 may facilitate in improving the performance of Wi-Fi 2.4 GHz. In addition, a distance L9 between the antenna radiator 120 and the bottom wall 1103 of the metal back cover 110 is between 6 mm and 10 mm, for example, 8.1 mm. The coaxial transmission line 130 is connected to the antenna radiator 120 and extends along the surface of the antenna radiator 120 relative to the front cover 116.

Figure 4:
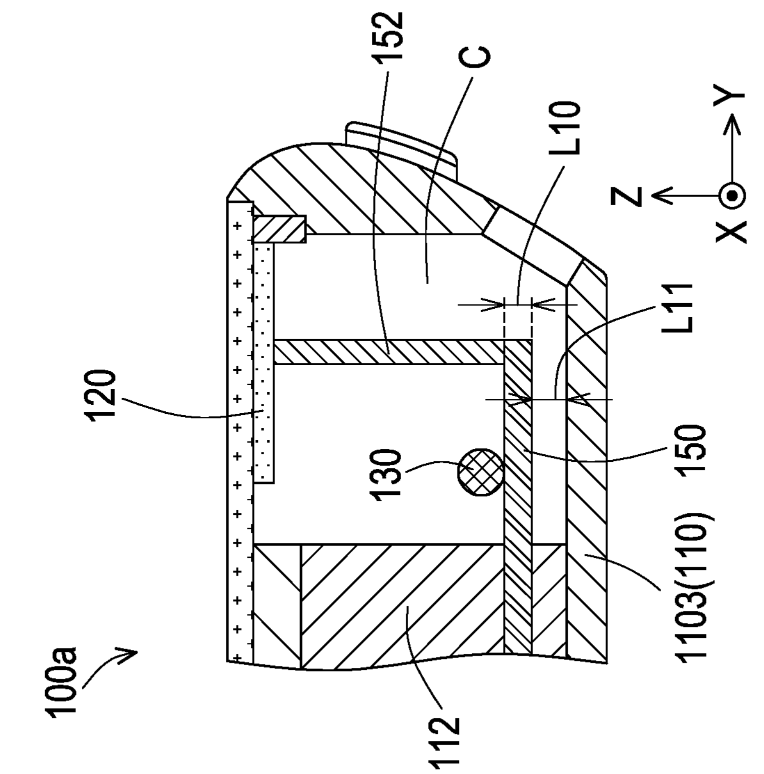
FIG. 4 is a partial cross-sectional schematic view of an electronic device according to another embodiment of the disclosure.

FIG. 4 is a partial cross-sectional schematic view of an electronic device according to another embodiment of the disclosure. Referring to FIG. 4, the main difference between an electronic device **100*a* of FIG. 4 and the electronic device 100 of FIG. 3 is the position of the coaxial transmission line 130**.

Specifically, in this embodiment, the electronic device **100*a* further includes an antenna module 150 and at least one conducting member 152. The number of the conducting members 152 corresponds to the number of the antenna radiators 120, and FIG. 4 only shows one conducting member 152 corresponding to one antenna radiator 120. The antenna module 150 includes a control circuit, which is configured to process the wireless signal received through the resonance of the antenna radiator 120 or process the electrical signal transmitted from the system end, to be sent out through the antenna radiator 120. In this embodiment, the antenna module 150 extends into the metal cavity C and is spaced apart from the antenna radiator 120, for example, disposed at the bottom as shown in FIG. 4, close to the bottom wall 1103. A thickness L10 of the antenna module 150 is, for example, 0.85 mm, and a distance L11 between the antenna module 150 and the bottom wall 1103 of the metal back cover 110** is, for example, 1.65 mm.

The conducting member 152 is connected between the feeding end of the antenna radiator 120 and the antenna module 150. The conducting member 152 is, for example, an elastic piece, but is not limited thereto. The coaxial transmission line 130 is disposed on the antenna module 150 and is spaced apart from the conducting member 152.

In this embodiment, the feeding end of the antenna radiator 120 is directed downward through the conducting member 152 and is connected to the positive end of the coaxial transmission line 130 through the antenna module 150, and the negative end of the coaxial transmission line 130 is connected to the ground plane of the antenna module 150, which is connected to the metal wall 112.

Figure 5:
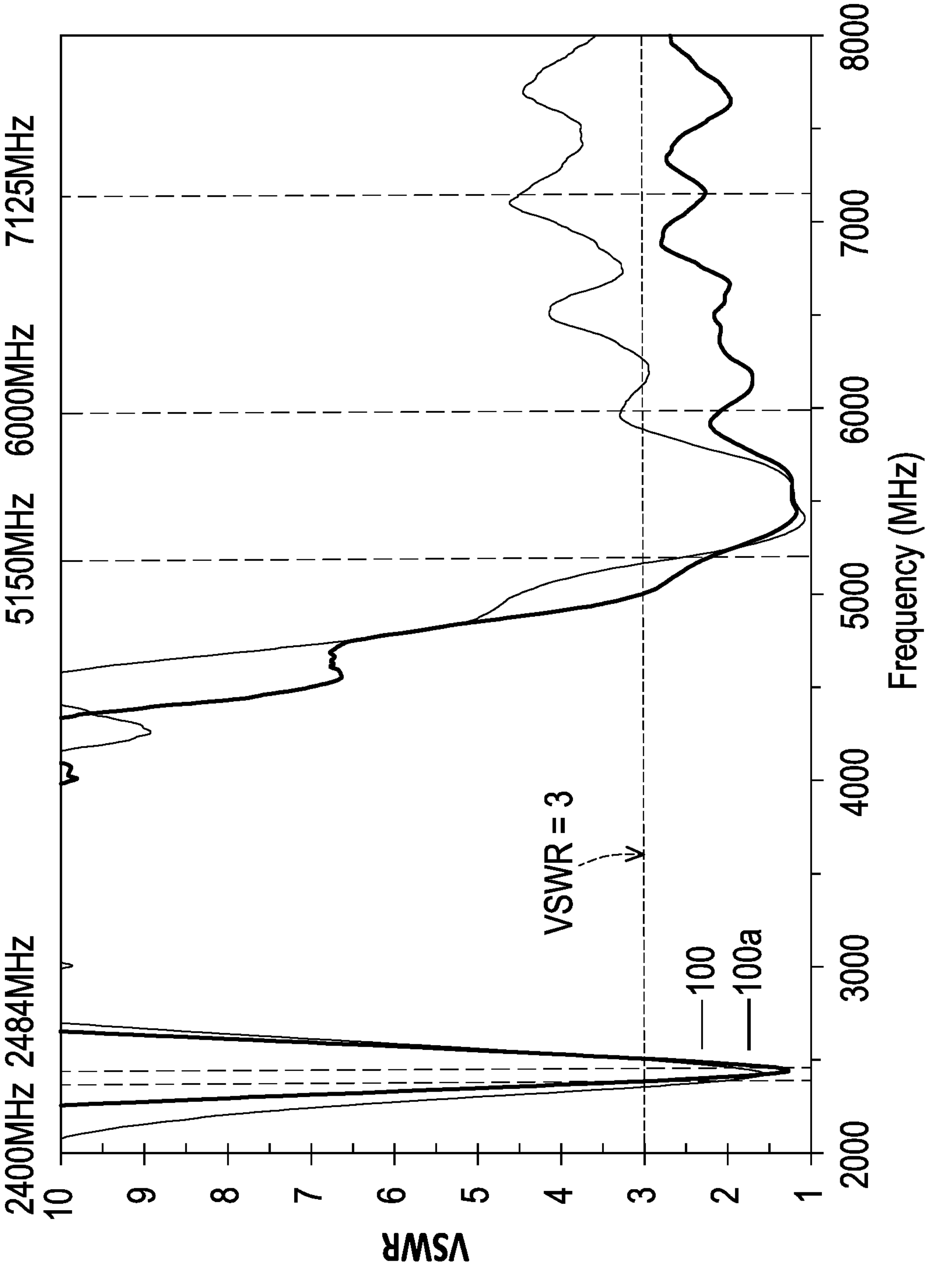
FIG. 5 is a relationship graph between the frequency and the VSWR of the antenna radiator of the electronic device of FIG. 1 and FIG. 4.

FIG. 5 is a relationship graph between the frequency and the VSWR of the antenna radiator of the electronic device of FIG. 1 and FIG. 4. Referring to FIG. 5, in this embodiment, the voltage standing wave ratio (VSWR) of the antenna radiator 120 of the electronic device 100 and the electronic device **100*a* may have a good performance. Especially at low frequencies (Wi-Fi 2.4 GHz), the VSWR of the antenna radiators 120 of both the electronic device 100 and the electronic device 100*a*** may be smaller than 3.

Figure 6:
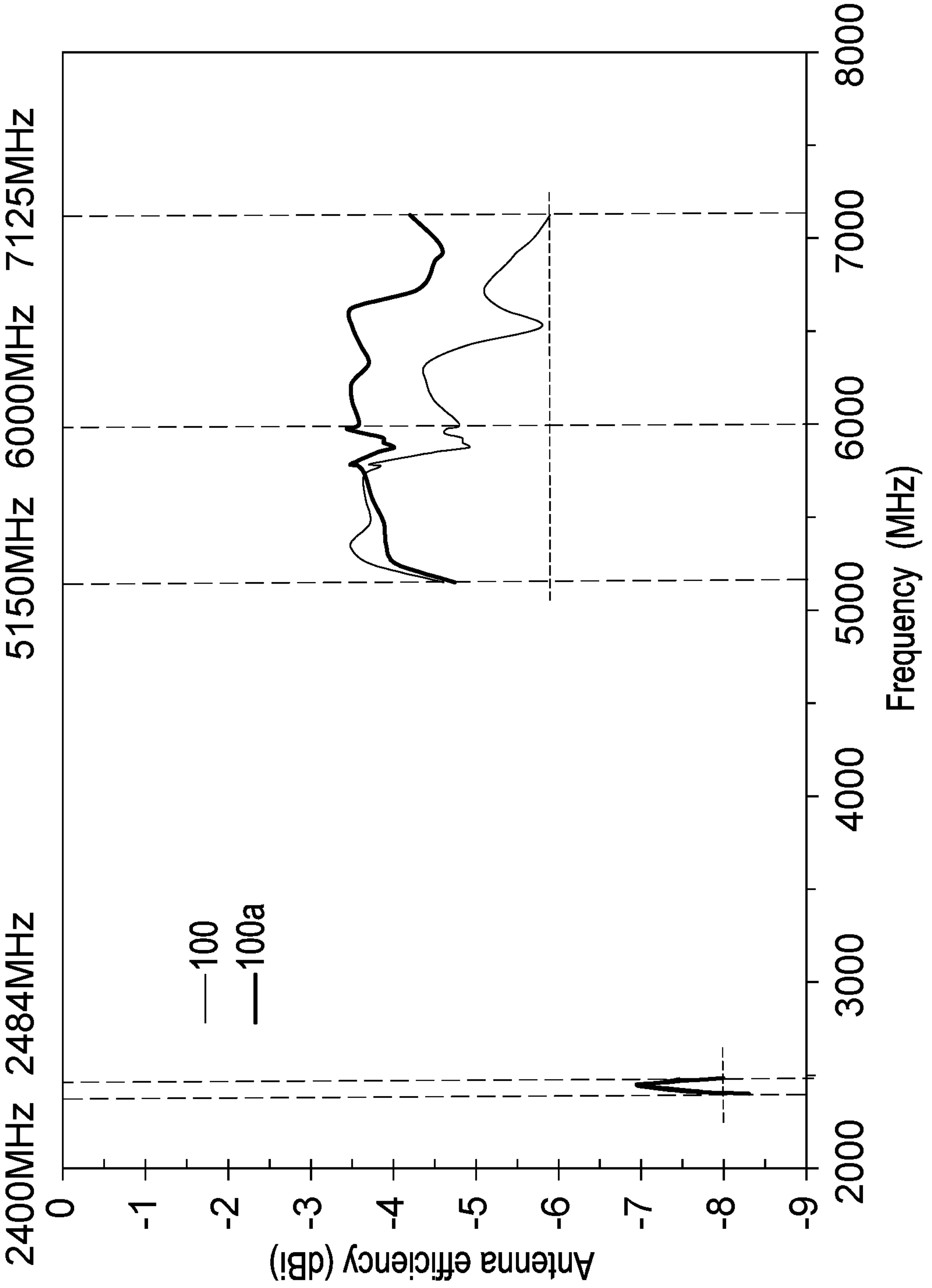
FIG. 6 is a relationship graph between the frequency and the antenna efficiency of the antenna radiator of the electronic device of FIG. 1 and FIG. 4.

FIG. 6 is a relationship graph between the frequency and the antenna efficiency of the antenna radiator of the electronic device of FIG. 1 and FIG. 4. Referring to FIG. 6, under the limitations of the metal back cover 110 and the narrow frame of the electronic device 100 and the electronic device 100*a*, the antenna efficiency of the antenna radiator 120 at low frequencies is −6.9 dBi to −8.3 dBi, and the antenna efficiency at high frequencies is −3.5 dBi to −4.7 dBi, which are good antenna efficiency performances.

Based on the above, the metal wall and the metal back cover of the electronic device of the disclosure together form a metal cavity corresponding to the frame area. The antenna radiator is disposed in the metal cavity and is connected to the metal back cover, and is spaced apart from the metal wall. Such a design may concentrate the radiated energy of the antenna radiator in a specific direction and have good antenna performance.

What is claimed is:

1. An electronic device, comprising:

a metal back cover, comprising a first side wall;

a front cover, covering the metal back cover and comprising a frame area and a display area, wherein the frame area of the front cover surrounds the display area;

a metal wall, disposed between the metal back cover and the front cover, wherein the metal wall and the metal back cover together form a metal cavity corresponding to the frame area;

at least one antenna radiator, disposed in the metal cavity, wherein the at least one antenna radiator is connected to the first side wall of the metal back cover, and is spaced apart from the metal wall by a distance, a projection of the at least one antenna radiator on the front cover is located in the frame area; and a touch module, disposed between the display area and the metal wall, wherein the metal wall comprises a first portion and a second portion perpendicularly connected, a projection of the first portion on the front cover is located in the display area, the first portion is connected to the touch module, a projection of the second portion on the front cover is located in the frame area, and the second portion is connected to the first side wall of the metal back cover.

2. The electronic device according to claim 1, wherein a distance between the first portion of the metal wall and a corresponding one of the at least one antenna radiator is between 1 mm and 3 mm, and a distance between the second portion of the metal wall and a corresponding one of the at least one antenna radiator is between 4 mm and 7 mm.

3. The electronic device according to claim 1, wherein a width of the metal wall is between 10 mm and 30 mm.

4. The electronic device according to claim 1, wherein the metal cavity is formed by surrounding the first side wall, a second side wall, and a bottom wall of the metal back cover, and the metal wall, and a distance between the at least one antenna radiator and the second side wall is between 12 mm and 16 mm.

5. The electronic device according to claim 4, wherein a distance between the at least one antenna radiator and the bottom wall of the metal back cover is between 6 mm and 10 mm.

6. The electronic device according to claim 1, further comprising at least one coaxial transmission line, wherein each of the at least one coaxial transmission line is connected to a corresponding one of the at least one antenna radiator and extends along a surface of the corresponding one of the at least one antenna radiator relative to the front cover.

7. The electronic device according to claim 1, further comprising an antenna module, a coaxial transmission line, and at least one conducting member, wherein the antenna module extends into the metal cavity and is spaced apart from the at least one antenna radiator, the at least one conducting member is connected between a feeding end of a corresponding one of the at least one antenna radiator and the antenna module, and the coaxial transmission line is disposed on the antenna module and is spaced apart from the at least one conducting member.

8. The electronic device according to claim 1, wherein each of the at least one antenna radiator comprises a first segment, a second segment, a third segment, a fourth segment and a fifth segment connected in sequence, the third segment, the fourth segment and the fifth segment are connected by bending to form a U-shape, the second segment is connected to the third segment and the first segment, the third segment comprises a feeding end, and the fifth segment is connected to the first side wall of the metal back cover.

9. The electronic device according to claim 8, wherein the second segment has a center line perpendicular to an extending direction of the first segment, a portion of the first segment, a portion of the third segment, and a portion of the fifth segment are located on a side of the center line to resonate at a low frequency band, and another portion of the first segment, another portion of the third segment, the fourth segment, and another portion of the fifth segment are located on another side of the center line to resonate at a high frequency band.

10. The electronic device according to claim 9, wherein the low frequency band is a Wi-Fi frequency band at 2.4 GHz, and the high frequency band is a Wi-Fi frequency band at 5 GHz to 7 GHz.

11. The electronic device according to claim 1, wherein the at least one antenna radiator comprises two antenna radiators, a second portion of the metal wall is located between the two antenna radiators, and a width of the second portion is between 10 mm and 30 mm.

* * * * *